(12) United States Patent
Rajapakse (10) Patent No.: US 9,699,684 B1
(45) Date of Patent: Jul. 4, 2017

(54) LOW-LATENCY MULTIMEDIA USING DUAL WIRELESS ADAPTERS

(71) Applicant: Blackfire Research Corporation, San Francisco, CA (US)

(72) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

(21) Appl. No.: 15/336,745

(22) Filed: Oct. 27, 2016

Related U.S. Application Data (60) Provisional application No. 62/367,930, filed on Jul. 28, 2016.

(51) Int. Cl.
*H04W 28/02* (2009.01)
*H04W 88/08* (2009.01)
*H04W 84/12* (2009.01)

(52) U.S. Cl.
CPC ... *H04W 28/0205* (2013.01); *H04W 28/0215* (2013.01); *H04W 84/12* (2013.01); *H04W 88/08* (2013.01)

(58) Field of Classification Search
CPC ....... H04W 76/02; H04W 4/00; H04W 84/12; H04W 88/06; H04W 74/00; H04W 4/008
See application file for complete search history.

(56) References Cited

U.S. PATENT DOCUMENTS

| | | | |
|---|---|---|---|
| 7,720,045 B2 | 5/2010 | Bahl et al. | |
| 9,019,898 B2 | 4/2015 | Damodaran | |
| 9,210,358 B2 | 12/2015 | Griffin | |
| 2006/0209892 A1* | 9/2006 | MacMullan | H04N 5/775 370/468 |
| 2016/0188279 A1* | 6/2016 | Rajamani | G06F 3/1454 345/2.3 |
| 2017/0013346 A1* | 1/2017 | Lee | H04R 1/1041 |

* cited by examiner

*Primary Examiner* — Jung Park
(74) *Attorney, Agent, or Firm* — Galvin Patent Law LLC; Brian R. Galvin (57) ABSTRACT

A computing device for low-latency multimedia using dual wireless adapters, comprising a first wireless adapter connected to a Wi-Fi access point; a second wireless adapter connected directly to a plurality of wireless devices; and an operating system comprising programming instructions stored in the memory and operating on the processor and configured to: receive streaming multimedia via a wireless network from a media source, using the first wireless network adapter; and send at least a subset of the streaming multimedia at least one of the plurality of wireless devices using the second wireless network adapter.

6 Claims, 9 Drawing Sheets

LOW-LATENCY MULTIMEDIA USING DUAL WIRELESS ADAPTERS

CROSS-REFERENCE TO RELATED APPLICATIONS

This application claims priority to U.S. provisional patent application Ser. No. 62/367,930, titled "LOW-LATENCY MULTIMEDIA USING DUAL WIRELESS ADAPTERS" filed on Jul. 28, 2016, the entire specification of which is incorporated herein by reference in its entirety.

BACKGROUND OF THE INVENTION

Field of the Art

The disclosure relates to the field of multimedia computing devices, and more particularly to the field of wireless multimedia computing devices requiring low latency.

Discussion of the State of the Art

It is commonplace to stream various multimedia content to one or more devices from a single computing device. For example, a "smart TV" may operate LINUX™ (or a variant of LINUX™ such as ANDROID™) and may display high-definition video on the smart TV and stream various channels of audio to audio playback devices (some on the Smart TV and some separate from it). Or, a user of a mobile device may wish to watch a video on the device while having the audio streamed to and played back from a plurality of wireless speakers. In another example, a media computing device may operate using an operating system such as ANDROID™ but has no built-in user interface; rather, it serves virtual screens to mobile devices, each of which has a full operating system user interface that can interact wirelessly with the media computing device (which may be, for example, an HDMI "stick" that plugs into an HDMI port of a television).

In all of these use cases, low latency networking is a critical success factor. Even slight latency can cause synchronization problems, poor multimedia playback due to jitter or irregular playback speeds, and the like. For demanding low-latency applications where wireless networking is used, any means of reducing the latency brings immediate user-sensible benefits.

What is needed, then, is a means for providing reliable, very low-latency wireless networking, particularly for use with mobile devices, smart TVs, and wireless speakers.

SUMMARY OF THE INVENTION

Accordingly, the inventor has conceived and reduced to practice, in a preferred embodiment of the invention, a system and various methods for low-latency multimedia using dual wireless adapters. The following non-limiting summary of the invention is provided for clarity, and should be construed consistently with embodiments described in the detailed description below.

To address the problem of low latency that was described above, dual wireless adapters are provided in a computing device. A first wireless adapter connects to a Wi-Fi access point (WAP) and acts as a member of a "normal" Wi-Fi network. Using the first wireless adapter, the computing device is able to access the Internet, for example to access one of the many media streaming services (e.g., NETFLIX™, HULU™, and the like). The second wireless adapter acts as a hotspot for direct connections to local devices that require low latency. Common examples of such devices are wireless speakers, mobile devices that host virtual screens of the computing device, and game controllers. By maintaining direct connections with these latency-sensitive devices (more accurately, the applications used on these devices tend to be latency-sensitive; for example, a degree of latency in streaming audio to a set of wireless speakers is easily detected by the human ear), the second wireless adapter can optimize the packet traffic going to these devices while also keeping all other unrelated traffic (which would be substantial on the first wireless adapter connected to the WAP), thereby minimizing latency to these devices to the maximum extent possible.

According to a preferred embodiment of the invention, a computing device for low-latency multimedia using dual wireless adapters is disclosed, comprising a first wireless adapter connected to a Wi-Fi access point; a second wireless adapter connected directly to a plurality of wireless devices; and an operating system comprising programming instructions stored in the memory and operating on the processor and configured to: receive streaming multimedia via a wireless network from a media source, using the first wireless network adapter; and send at least a subset of the streaming multimedia at least one of the plurality of wireless devices using the second wireless network adapter.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, in a preferred embodiment of the invention, computing device for low-latency multimedia using dual wireless adapters.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 1:
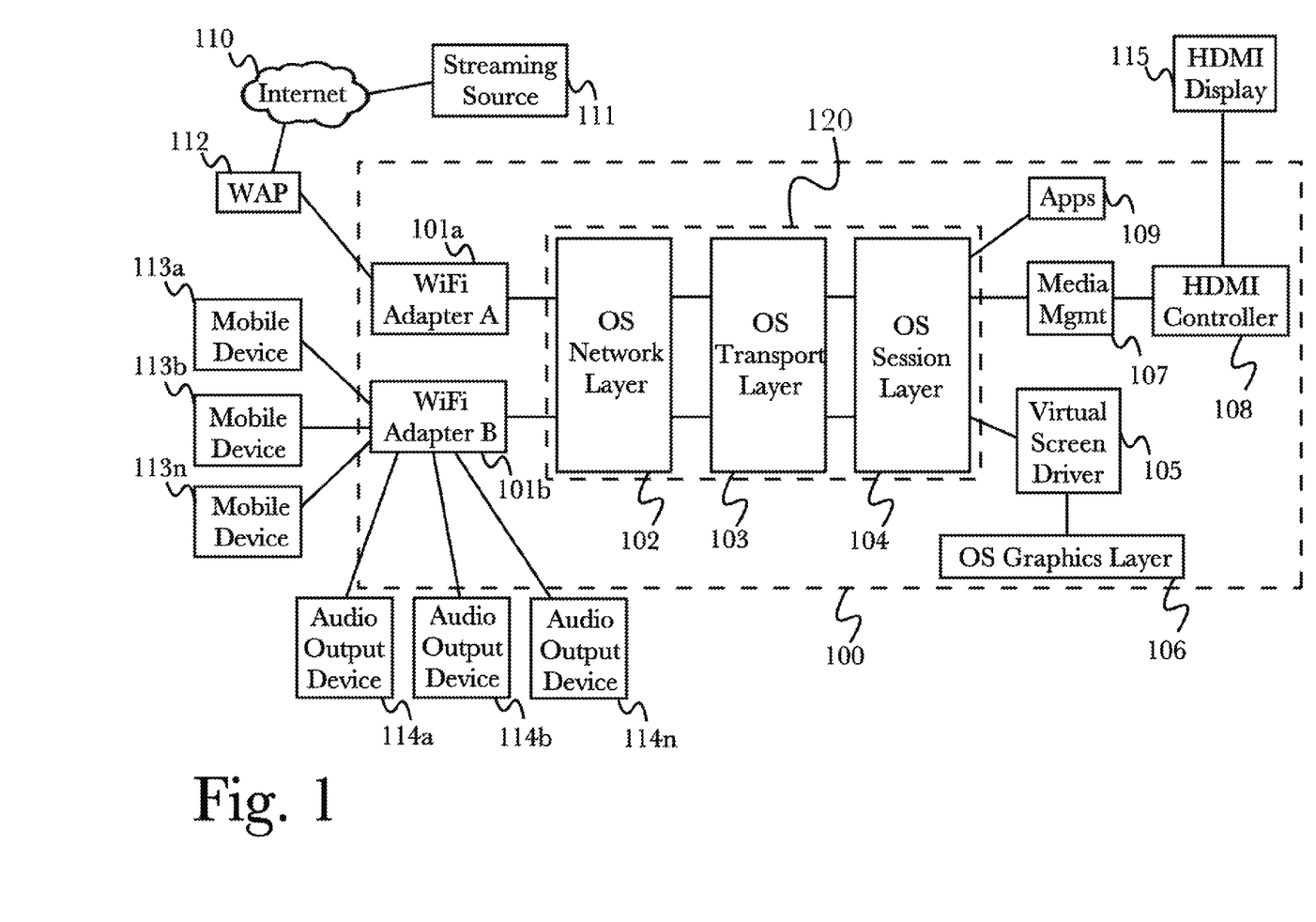
FIG. 1 is a block diagram illustrating an exemplary system architecture for low-latency multimedia using dual wireless adapters, according to a preferred embodiment of the invention.

FIG. 1 is a block diagram illustrating an exemplary computing device 100 capable of low-latency multimedia using dual wireless adapters, according to a preferred embodiment of the invention. According to the embodiment, a computing device 100 typically comprises at least a memory 11 and a processor 12 (as described below, referring to FIG. 4), configured to operate a software operating system, for example an operating system (OS) 120 drawn from the set including (but not limited to) ANDROID™, APPLE IOS™, WINDOWS™, and various forms of LINUX™.

According to the embodiment, computing device 100 may use a dual wireless adapter configuration to minimize latency for latency-sensitive applications. For example, according to the embodiment computing device 100 comprises a first wireless adapter 101a configured to connect wirelessly to a Wi-Fi access point (WAP) 112 or similar wireless radio communication, for example wireless adapter 101a may be configured to utilize a cellular wide-area network (WAN), and via the WAP to the Internet 110 to communicate with a plurality of multimedia streaming sources 111. First wireless adapter 101a operates internally in a normal way, via a network stack of OS and in particular via transport layer 103, network layer 102 and session layer 104.

Further according to the embodiment, computing device 100 may further comprise a second wireless network adapter 101b that also interoperates via the OS network stack 102.

Second wireless adapter 101b may connect directly with a plurality of mobile devices 113a-n and a plurality of wireless audio playback devices 114a-n. Second wireless adapter 101b therefore acts as a wireless hotspot connected to devices performing latency-sensitive applications. Computing device 100 may further comprise a media management subsystem 107 that manages media content.

According to the embodiment, a wide variety of hardware arrangements may be utilized to facilitate the operation of dual wireless network adapters 101a, 101b. For example, a single wireless network hardware controller may operate multiple antennas, as is common in multiple-input and multiple-output (MIMO) hardware arrangements, as described in greater detail below (referring to FIG. 8). This is commonly used to increase bandwidth and speed using multipath propagation or spatial multiplexing typically combined with orthogonal frequency-division multiplexing (OFDM) or orthogonal frequency division multiple access (OFDMA), but may also be used to communicate with multiple network hosts or endpoints (such as WAP 112 and a plurality of mobile devices 113a-n, as described above) in a practice known as "multihoming", for example by utilizing separate antennas to communicate on different wireless radio frequencies or channels.

Another exemplary arrangement may utilize multiple distinct wireless radios each with their own interface controller, for example as is commonly used in mobile device design for smartphones or tablets, or as in a personal computer with multiple network interface controllers (NICs), such as multiple WiFi hardware expansion cards. Mobile devices commonly utilize separate WiFi and cellular radio interfaces, allowing them to connect simultaneously to both local and wide-area networks as needed, for example to improve user experience by reducing network loss while in motion (for example, if a user moves out of range of a WiFi LAN to which they are connected, the mobile device may automatically switch to using a cellular WAN for the network session). When using multiple NICs, software operated by the operating system of the computing device 100 may process the different connections and optionally virtualize them into a single network by bridging the two connections internally for easier low-latency communication (for example, so that all network endpoints accessible via either NIC are visible to software simultaneously, without needing to select a particular NIC, network, or subnet). It should be appreciated that while reference may be made to particular hardware arrangements for multiple wireless adapters such arrangements are exemplary and provided to describe the overall function in a clear manner, and that a wide variety of arrangements and hardware combinations may be utilized according to the embodiments.

A third exemplary arrangement may be a wireless network interface controller (NIC) that operates a single wireless radio, that is configured to operate on multiple channels within a specific frequency band. This may be accomplished through a variety of multiple-access networking approaches, and enables the use of multiple channels on a single frequency band to communicate with different endpoints. For example, in an 802.11n WiFe network, all communication occurs in the nominal 2.4 GHz frequency band, but multiple channels are available. Utilizing more than one channel may enable a single NIC and radio to communicate independently with multiple access points, or with an access point and a plurality of devices on a different channel, or other complex network arrangements.

According to the embodiment, media management subsystem 107 may receive streaming media from first wireless adapter 101a via session layer 104, and process the streaming media. Media management subsystem 107 may then identify a subset of the streaming media that is to be delivered wirelessly to latency-sensitive devices 113, 114. The selected media subset may then be sent via session layer 104 and so forth to second wireless adapter 101b, which then transmits the selected streaming media to one or more of mobile devices 113a-n and wireless audio playback devices 114a-n. It will be appreciated by one having ordinary skill in the art that various arrangements of media streaming via second wireless adapter 101b are envisioned with the scope of the invention. For example, in one exemplary arrangement a high-definition video stream may be received along with several channels of audio; the high-definition video would be viewed on an HDMI display device 115 connected via an HDMI interface controlled by HDMI controller 108, such as a television or computer monitor, while the audio channels would be either played (optionally) as native audio of computing device 100 and one or more wireless audio devices 114a-n, each of which receives appropriate audio channels from media management subsystem 107 via second wireless adapter 101b. In another exemplary arrangement, virtual screen driver 105 may operate a plurality of virtual (logical) interactive software interfaces ("virtual screens") and may present at least a portion of these screens for interaction via the plurality of mobile devices 113a-n communicating via second wireless adapter 101b.

The operating system of computing device 100 may generally have a "home screen" or similar primary environment that may be used by a user to interact with various hardware or software features and functions of computing device 100. Alternatively, the OS may provide a plurality of logical desktops or other virtual screens to users via mobile devices 113a-n. To facilitate user interaction, virtual screen driver 105 may listen for connections via a network or physical connection from a plurality of mobile devices 113a-n (such as, for example including but not limited to, a tablet computing device or smartphone), and may present a virtual screen derived from native OS graphics layer 106 to a device after connecting. A user may then interact with his mobile device normally using whatever means are available according to the particular configuration of the mobile device 113a-n, and this interaction may be provided to virtual screen driver 105 for translation and delivery to the OS 120. In this manner, media may be presented on an external display device 115 such as a high-definition television (the device of the invention typically being inserted into an HDMI port of the television, and controlling the television using HDMI controller 108), while users interact with an operating system via virtual screen driver 105, allowing users to interact with software applications 109. This allows users to perform actions such as installing programs, playing games, modifying media playback configurations, selecting media for presenting to external display device 115, or performing administrative tasks.

It should be noted that, while HDMI is used in the example of FIG. 1 and FIG. 8 (below) and is discussed throughout, other similar media interfaces may be used in place of HDMI, according to the invention. For example, DISPLAYPORT™ interfaces may be used; in such embodiments, HDMI controller 108 and HDMI interface 115 would be instead a DISPLAYPORT™ controller 108 and a DISPLAYPORT™ interface 115; similarly, other newly emerging high-definition media interfaces may be used in various embodiments of the invention. It can be seen that in the arrangement of system 100, dual wireless adapters may be used to allow a first wireless adapter 101a to manage Internet connectivity and non-latency-sensitive (or at least less critically latency-sensitive) network operations, while second wireless adapter 101b acts as a low-latency hotspot for directly connected latency-sensitive devices 113a-n, 114a-n.

Figure 2:
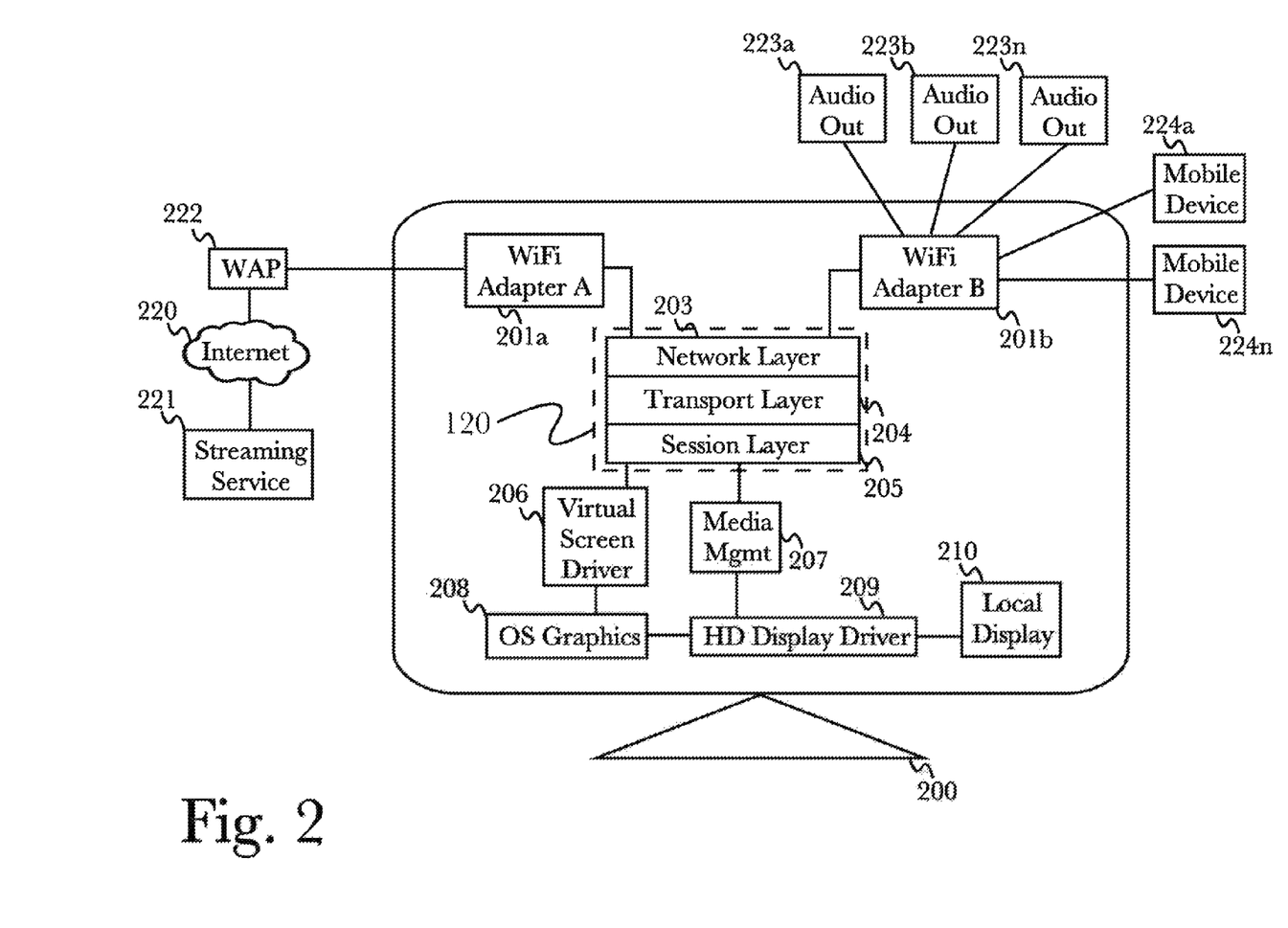
FIG. 2 is a block diagram illustrating an alternate exemplary system architecture for low-latency multimedia using dual wireless adapters, according to a preferred embodiment of the invention.

FIG. 2 is a block diagram illustrating an alternate computing device (for example, a "smart TV") 200, according to a preferred embodiment of the invention. According to the embodiment, computing device 200 typically comprises at least a memory 11 and a processor 12 (as described below, referring to FIG. 4), configured to operate a software operating system, for example an operating system (OS) drawn from the set including (but not limited to) ANDROID™, APPLE IOS™, WINDOWS™, and various forms of LINUX™. According to the embodiment, computing device 200 uses a dual wireless adapter configuration to minimize latency for latency-sensitive applications. Specifically, according to the embodiment computing device 200 comprises a first wireless adapter 201a that connects wirelessly to a Wi-Fi access point (WAP) 222 and via WAP 222 to the Internet 220 and one or more multimedia streaming service sources 221. First wireless adapter 201a operates internally in a normal way, via a network stack of OS and in particular via transport layer 204, network layer 203 and session layer 205.

According to the embodiment, computing device 200 further comprises a second wireless network adapter 201b that also interoperates via the OS network stack 203. Second wireless adapter 201b may connect directly with a plurality of mobile devices 224a-n and a plurality of wireless audio playback devices 223a-n. Second wireless adapter 201b therefore acts as a wireless hotspot connected to devices performing latency-sensitive applications. Computing device 200 may further comprise a media management subsystem 207 that manages media content. According to some embodiments, media management subsystem 207 receives streaming media from first wireless adapter 201a via session layer 205, and processes the streaming media. In one aspect, media management subsystem 207 identifies a subset of the streaming media that is to be delivered wirelessly to latency-sensitive devices 223a-n, 224a-n. The selected media subset may then be sent via session layer 205 and so forth to second wireless adapter 201b, which then transmits the selected streaming media to one or more of mobile devices 224a-n and wireless audio playback devices 223a-n.

It will be appreciated by one having ordinary skill in the art that various arrangements of media streaming via second wireless adapter 201b are envisioned with the scope of the invention. For example, in one exemplary arrangement a high-definition video stream may be received along with several channels of audio; the high-definition video would be viewed on a local high-definition display 210 connected to the OS via high-definition display driver 209, while the audio channels would be either played (optionally) as native audio of computing device 200 or one or more wireless audio devices 223a-n, each of which receives appropriate audio channels from media management subsystem 207 via second wireless adapter 201b. In another aspect, virtual screen driver 206 may operate a plurality of virtual (logical) interactive software interfaces ("virtual screens") and may present at least a portion of these screens for interaction via the plurality of mobile devices 224a-n communicating via second wireless adapter 201b. The operating system of computing device 200 may generally have a "home screen" or similar primary environment that may be used by a user to interact with various hardware or software features and functions of computing device 200. Alternatively, the OS may provide a plurality of logical desktops or other virtual screens to users via mobile devices 224a-n.

To facilitate user interaction, virtual screen driver 206 may listen for connections via a network or physical connection from a plurality of mobile devices 224a-n (such as, for example including but not limited to, a tablet computing device or smartphone), and may present a virtual screen derived from native OS graphics layer 208 to a device after connecting. A user may then interact with his mobile device normally using whatever means are available according to the particular configuration of the mobile device, and this interaction may be provided to virtual screen driver 206 for translation and delivery to the OS. In this manner, media may be presented on a local high-definition display device 210, while users interact with an operating system via virtual screen driver 206, allowing users to interact with software applications. This allows users to perform actions such as installing programs, playing games, modifying media playback configurations, selecting media for presenting to local display device 210, or performing administrative tasks.

Figure 8:
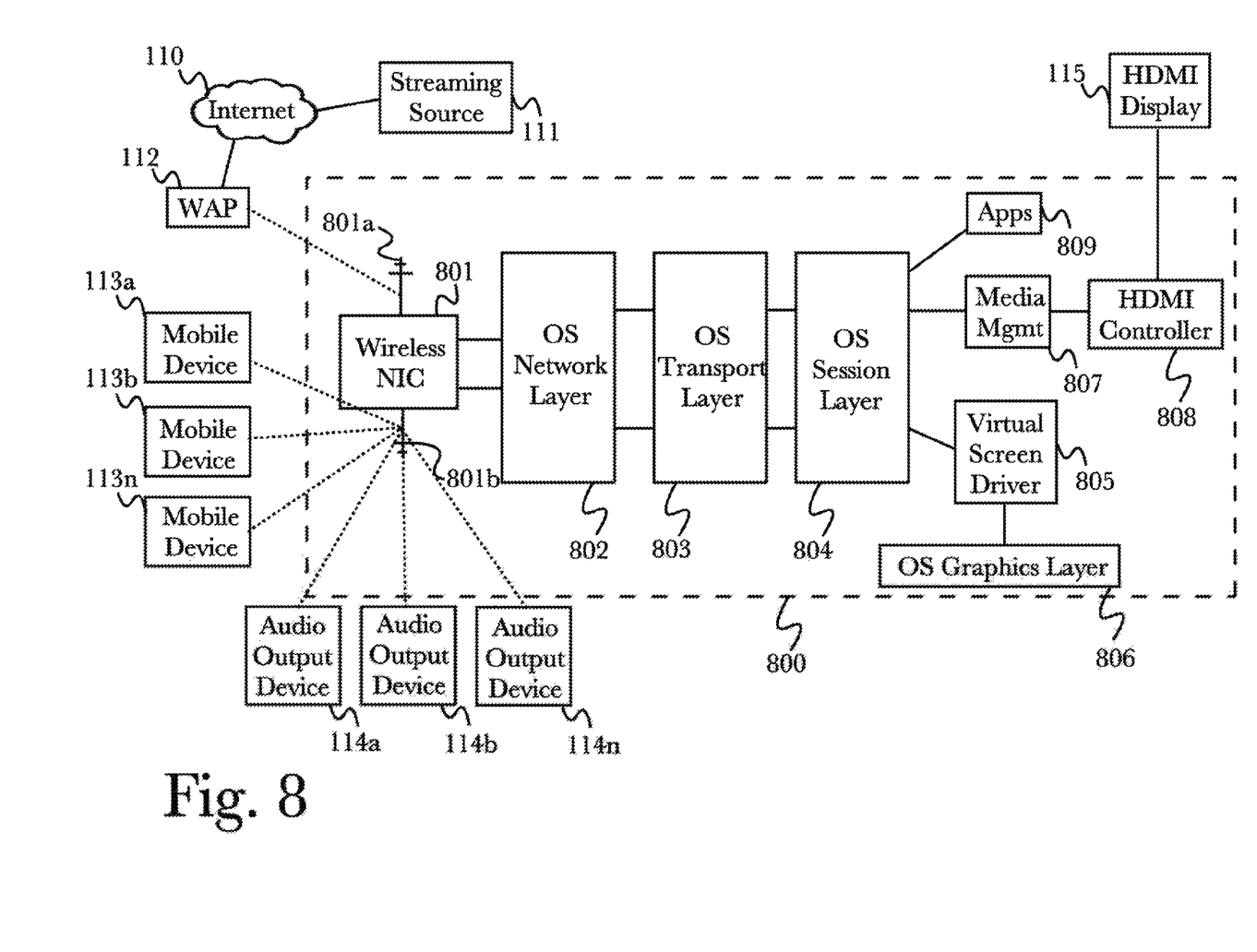
FIG. 8 is a block diagram illustrating an exemplary system architecture for low-latency multimedia using dual wireless adapters, illustrating the use of a single hardware controller operating multiple radio antennas.

FIG. 8 is a block diagram illustrating an exemplary system architecture for low-latency multimedia using dual wireless adapters, illustrating the use of a single hardware controller operating multiple radio antennas. According to the embodiment, a computing device 800 typically comprises at least a memory 11 and a processor 12 (as described below, referring to FIG. 4), configured to operate a software operating system, for example an operating system (OS) drawn from the set including (but not limited to) ANDROID™, APPLE IOS™, WINDOWS™, and various forms of LINUX™.

According to the embodiment, computing device 800 may use a dual wireless antenna configuration with a single network interface controller to minimize latency for latency-sensitive applications. For example, according to the embodiment computing device 800 comprises a first wireless antenna 801a operated by a NIC 801 configured to connect wirelessly to a Wi-Fi access point (WAP) 112 or similar wireless radio communication, for example wireless antenna 801a may be configured to utilize a cellular wide-area network (WAN), and via the WAP to the Internet 110 to communicate with a plurality of multimedia streaming sources 111. First wireless antenna 801a operates internally in a normal way, via a network stack of OS and in particular via transport layer 803, network layer 802 and session layer 804.

Further according to the embodiment, computing device 800 may further comprise a second wireless network antenna 801b that is also operated by NIC 801 and also interoperates via the OS network stack. Second wireless antenna 801b may connect directly with a plurality of mobile devices 113a-n and a plurality of wireless audio playback devices 114a-n. Second wireless antenna 801b therefore acts as a wireless hotspot connected to devices performing latency-sensitive applications. Computing device 800 may further comprise a media management subsystem 807 that manages media content.

According to the embodiment, media management subsystem 807 may receive streaming media from first wireless antenna 801a via NIC 801 and session layer 804, and process the streaming media. Media management subsystem 807 may then identify a subset of the streaming media that is to be delivered wirelessly to latency-sensitive devices 113, 114. The selected media subset may then be sent via session layer 804 and so forth to second wireless antenna 801b, which then transmits the selected streaming media to one or more of mobile devices 113a-n and wireless audio playback devices 114a-n. It will be appreciated by one having ordinary skill in the art that various arrangements of media streaming via second wireless antenna 801b are envisioned with the scope of the invention. For example, in one exemplary arrangement a high-definition video stream may be received along with several channels of audio; the high-definition video would be viewed on an HDMI display device 115 connected via an HDMI interface controlled by HDMI controller 808, such as a television or computer monitor, while the audio channels would be either played (optionally) as native audio of computing device 800 and one or more wireless audio devices 114a-n, each of which receives appropriate audio channels from media management subsystem 107 via second wireless antenna 801b. In another exemplary arrangement, virtual screen driver 805 may operate a plurality of virtual (logical) interactive software interfaces ("virtual screens") and may present at least a portion of these screens for interaction via the plurality of mobile devices 113a-n communicating via second wireless antenna 801b.

The operating system of computing device 800 may generally have a "home screen" or similar primary environment that may be used by a user to interact with various hardware or software features and functions of computing device 800. Alternatively, the OS may provide a plurality of logical desktops or other virtual screens to users via mobile devices 113a-n. To facilitate user interaction, virtual screen driver 805 may listen for connections via a network or physical connection from a plurality of mobile devices 113a-n (such as, for example including but not limited to, a tablet computing device or smartphone), and may present a virtual screen derived from native OS graphics layer 806 to a device after connecting. A user may then interact with his mobile device normally using whatever means are available according to the particular configuration of the mobile device 113a-n, and this interaction may be provided to virtual screen driver 805 for translation and delivery to the OS. In this manner, media may be presented on an external display device 115 such as a high-definition television (the device of the invention typically being inserted into an HDMI port of the television, and controlling the television using HDMI controller 808), while users interact with an operating system via virtual screen driver 805, allowing users to interact with software applications 809. This allows users to perform actions such as installing programs, playing games, modifying media playback configurations, selecting media for presenting to external display device 115, or performing administrative tasks.

Description of Method Embodiments

Figure 3:
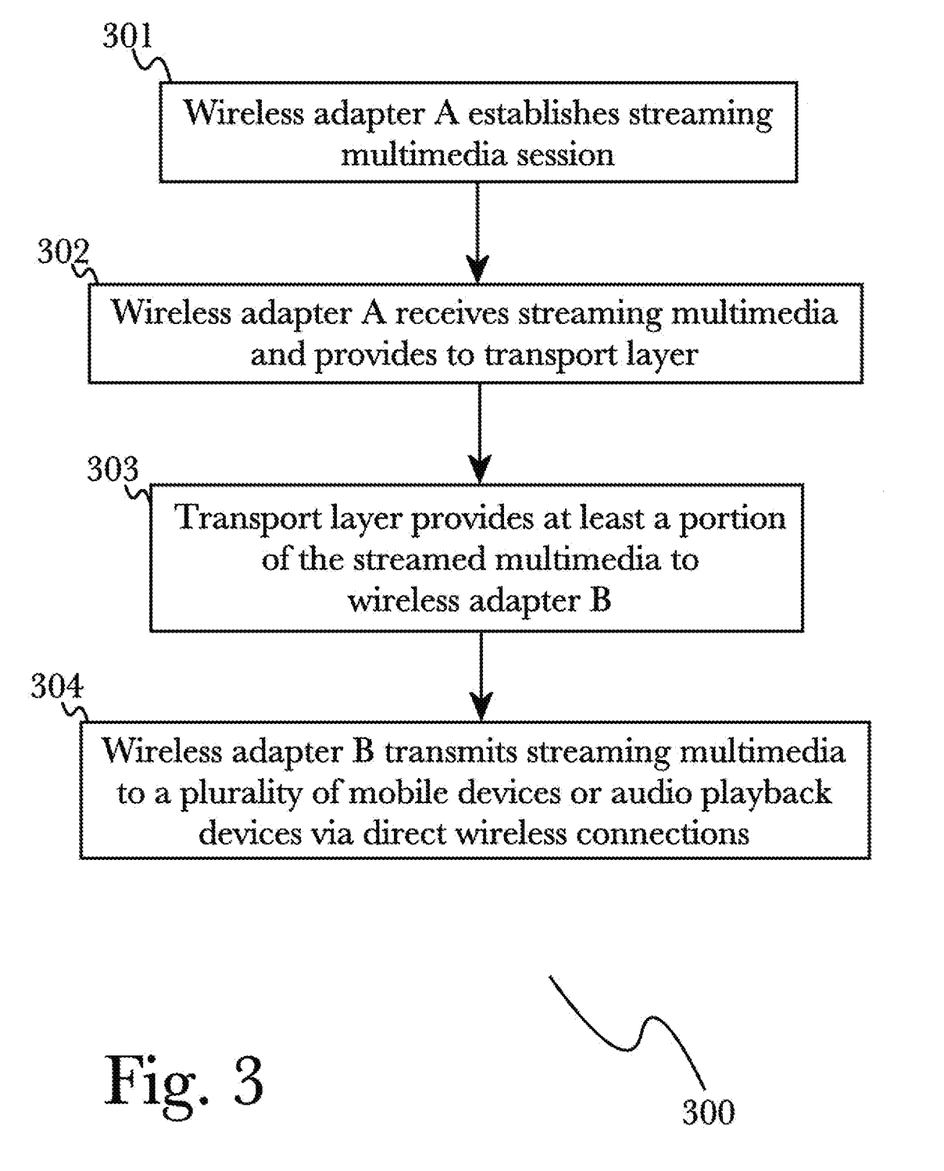
FIG. 3 is a flow diagram illustrating an exemplary method for low-latency multimedia using dual wireless adapters, according to a preferred embodiment of the invention.

FIG. 3 shows a method 300 for low-latency multimedia using a computing device having dual wireless adapters, according to a preferred embodiment of the invention. In a first step 301, a streaming multimedia session is established using the first wireless network adapter 101a/201a. The streaming media may be obtained from a network-resident media source 111/221, and is transmitted via a wireless access point 112/222 to which the first wireless adapter 101a/201a is connected. In a second step 302, streaming media content for the session is received at the first wireless network adapter 101a/201a and passed to the transport layer 103/204 of the operating system. In a third step 303, at least a portion of the streamed multimedia content is sent by the transport layer 103/204 to the second wireless adapter 101b/201b, which then, in a fourth step 304 transmits the media content to one or more of the mobile devices 113/224 or wireless audio playback devices 114/223 via the direct wireless connections it maintains with those devices.

Figure 9:
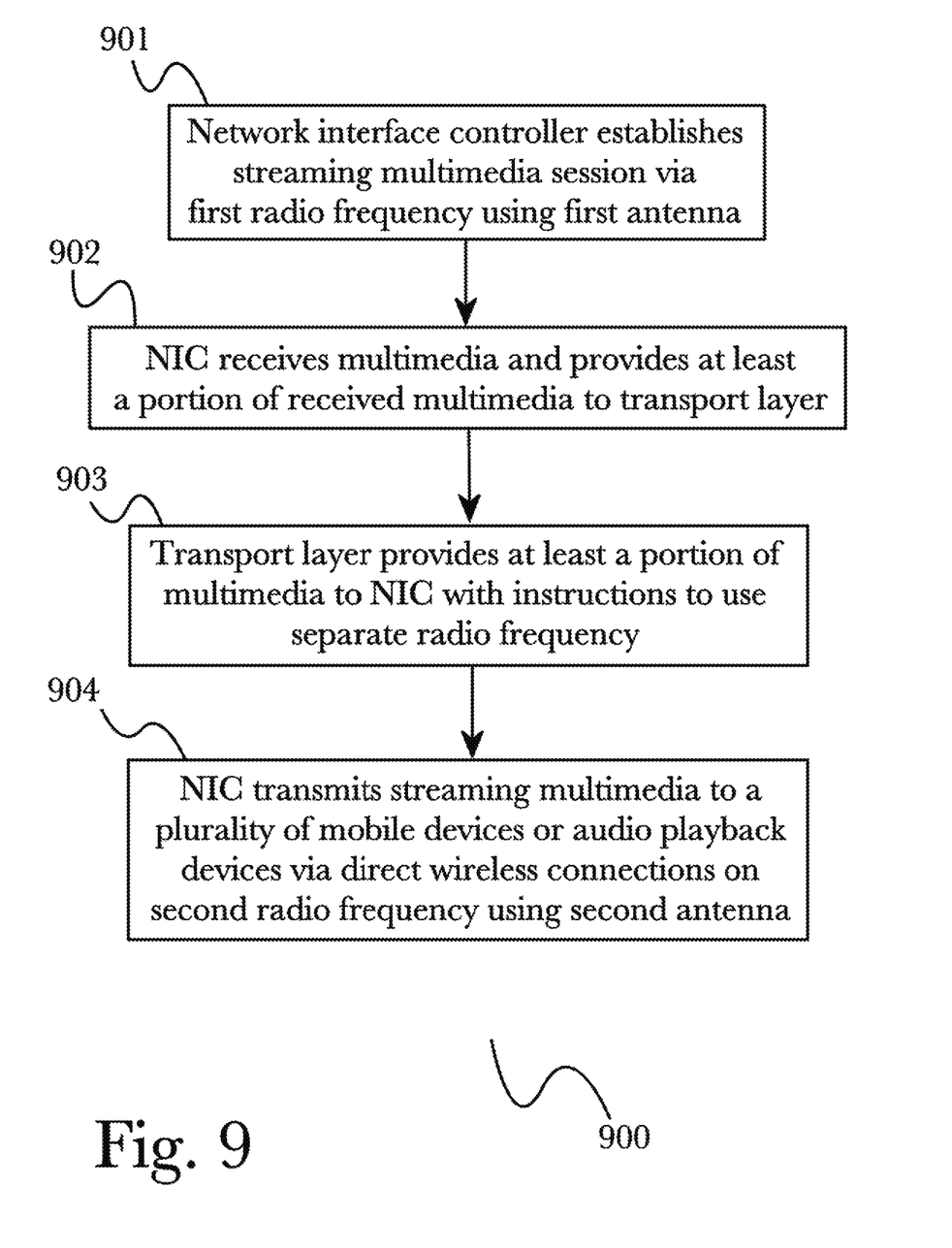
FIG. 9 is a flow diagram illustrating an exemplary method for low-latency multimedia using dual wireless adapters, describing the use of multiple antennas to communicate on different radio channels or frequencies.

FIG. 9 is a flow diagram illustrating an exemplary method 900 for low-latency multimedia using dual wireless adapters, describing the use of multiple antennas to communicate on different radio channels or frequencies. In a first step 901, a streaming multimedia session is established by a network interface controller (NIC) 801 using a first wireless network antenna 801a. The streaming media may be obtained from a network-resident media source 111/221, and is transmitted via a wireless access point 112/222 to which the first wireless antenna 801a is connected. In a second step 902, streaming media content for the session is received at the first wireless network antenna 801a and passed to the transport layer 103/204/803 of the operating system. In a third step 903, at least a portion of the streamed multimedia content is sent by the transport layer 103/204/803 to the NIC 801 along with instructions to utilize a different wireless radio frequency (for example, a different WiFi channel or band), to be transmitted via second wireless antenna 801b, which then, in a fourth step 904 transmits the media content to one or more of the mobile devices 113/224 or wireless audio playback devices 114/223 via the direct wireless connections it maintains with those devices on a separate radio frequency from the streaming session established via the first wireless network antenna 801a.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
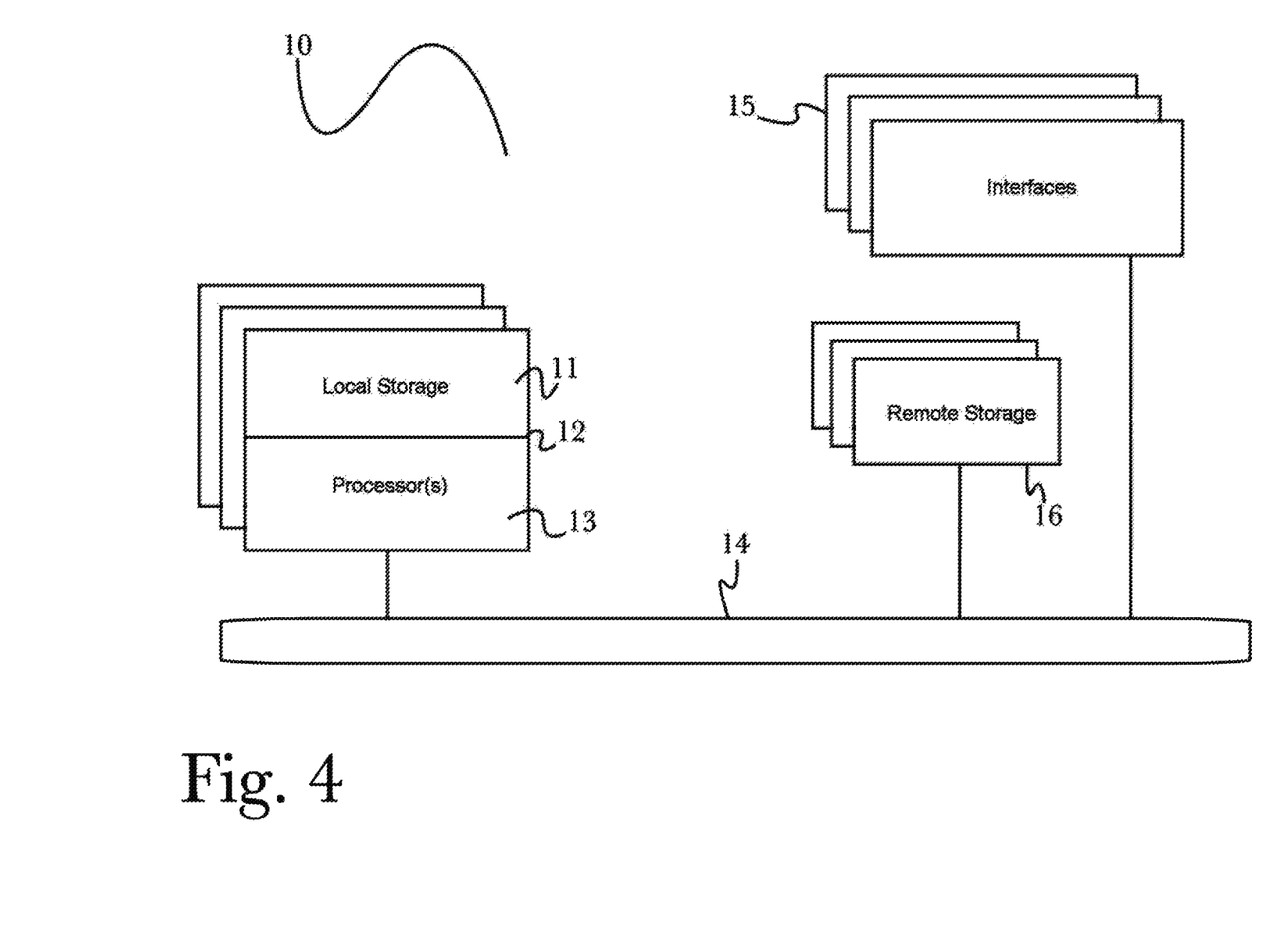
FIG. 4 is a block diagram illustrating an exemplary hardware architecture of a computing device used in an embodiment of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
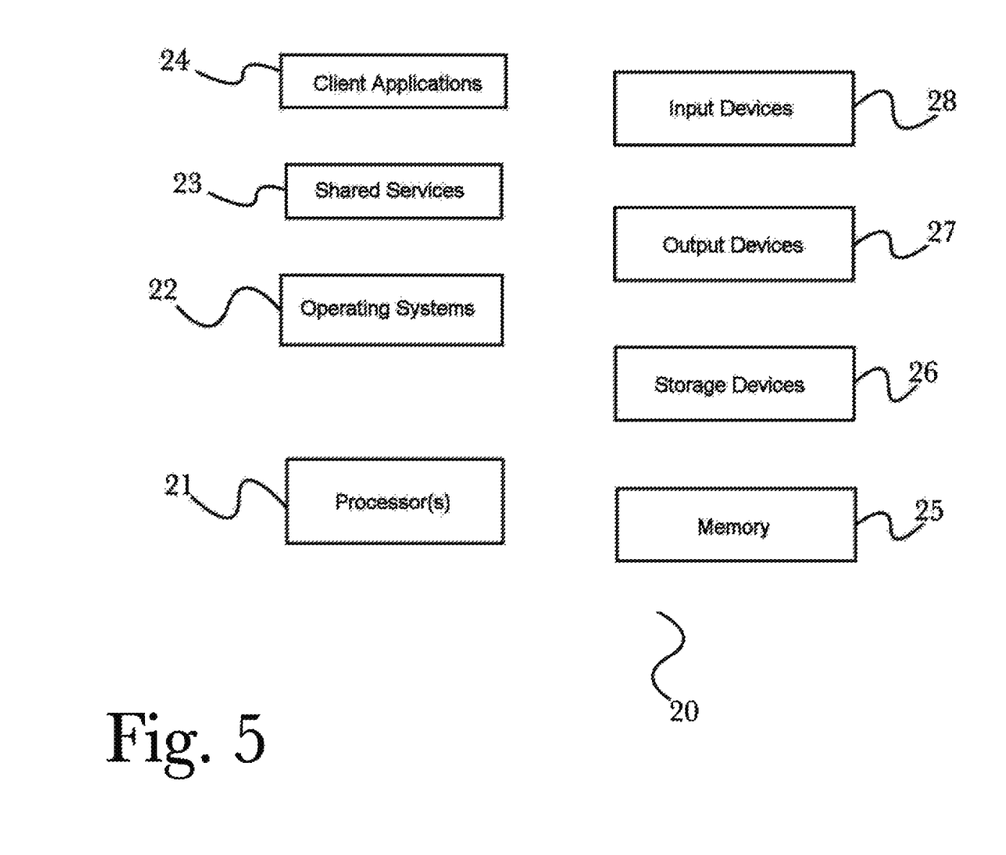
FIG. 5 is a block diagram illustrating an exemplary logical architecture for a client device, according to an embodiment of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
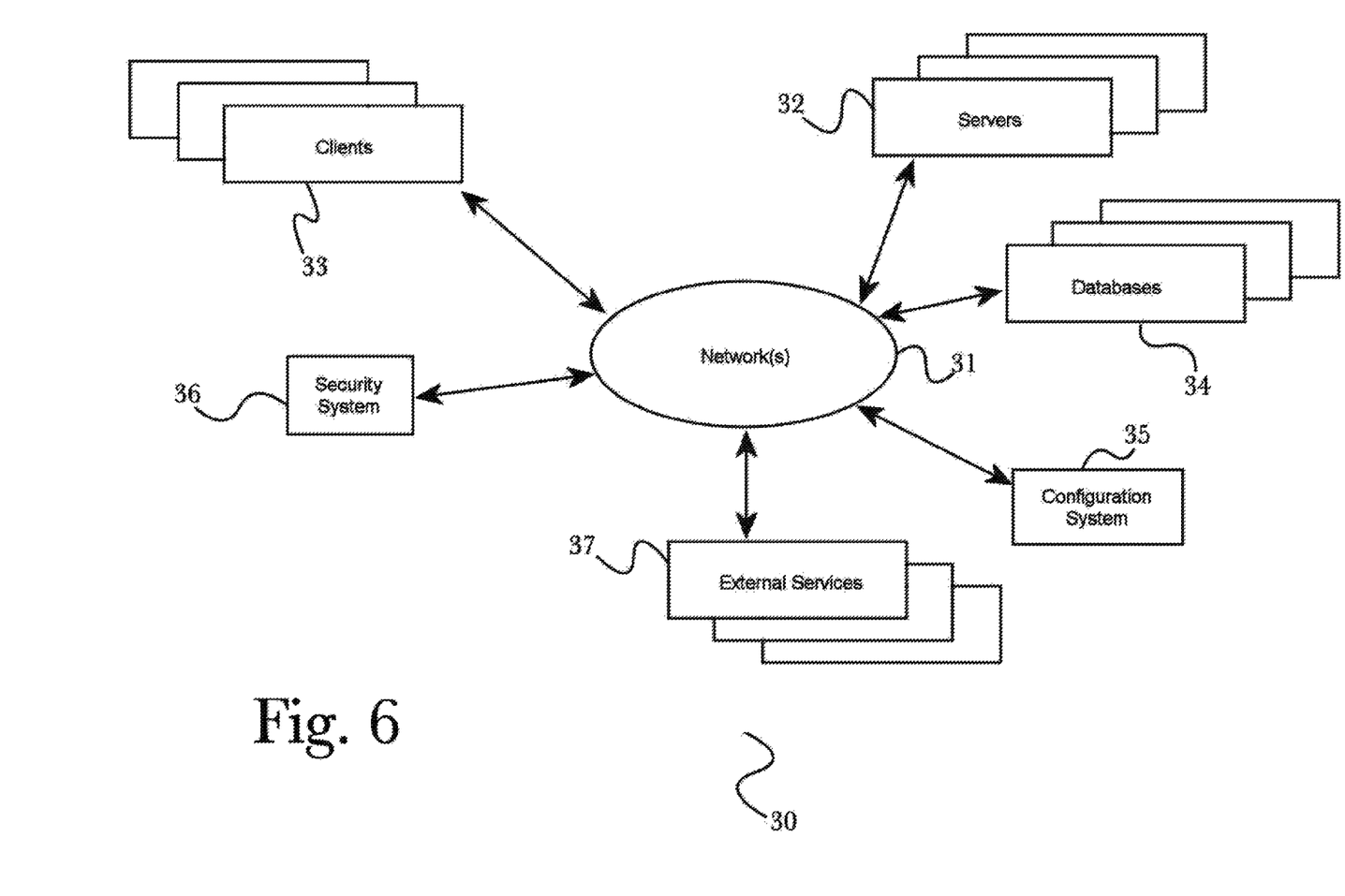
FIG. 6 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
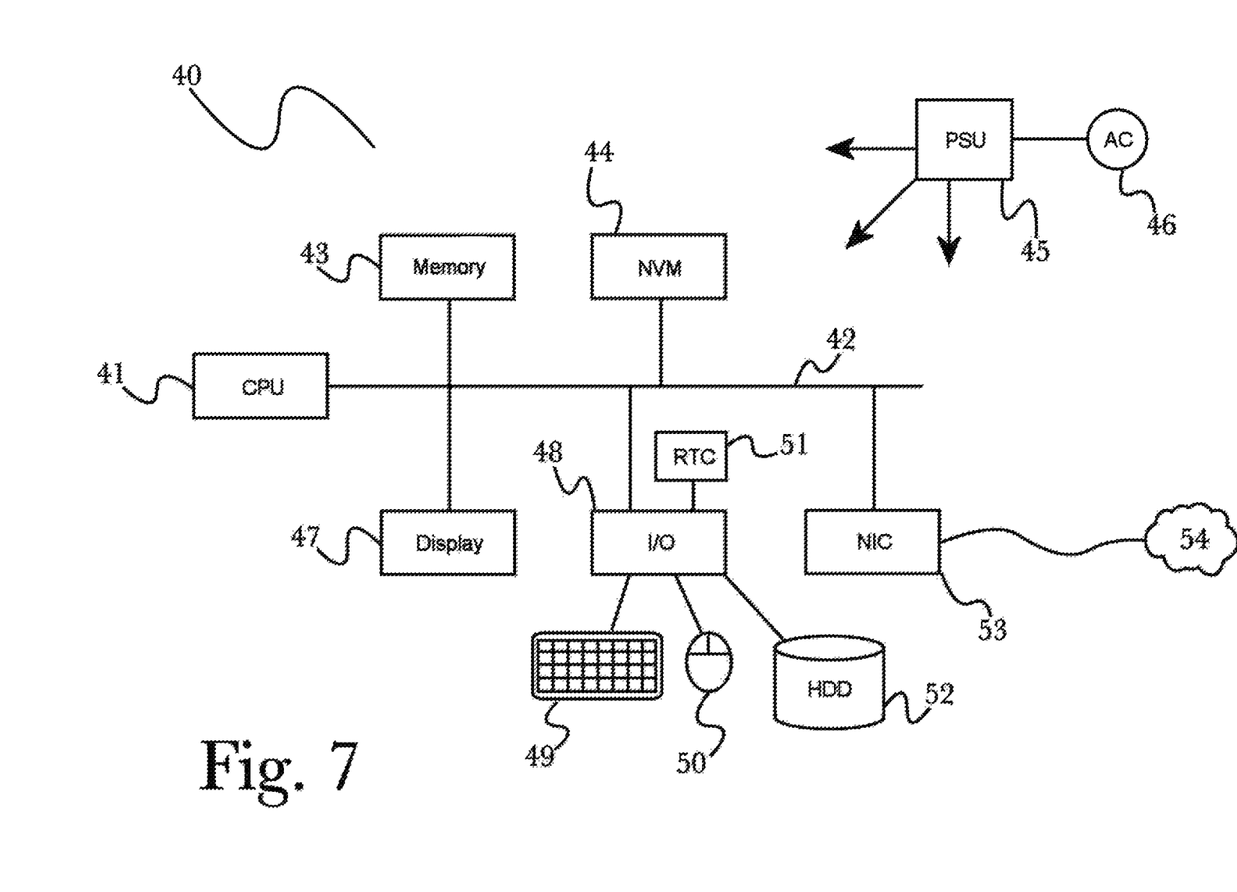
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A computing device for low-latency multimedia using dual wireless adapters, comprising:
   a processor;
   a memory;
   a network interface controller;
   a first wireless network adapter connected to the network interface controller and to a Wi-Fi access point using a first antenna and a first frequency;
   a second wireless network adapter connected to the network interface controller and directly via Wi-Fi to a plurality of wireless devices using a second antenna and a second frequency; and
   an operating system comprising programming instructions stored in the memory and operating on the processor and configured to:
     establish, using the network interface controller, a streaming multimedia session;
     receive, at a transport layer of the operating system from the streaming multimedia session, streaming multimedia from the Wi-Fi access point, using the first wireless network adapter;
     instruct the transport layer to provide at least a portion of the received multimedia to the second wireless network adapter; and
     send, using the network interface controller, at least the portion of the streaming multimedia to at least one of the plurality of wireless devices using the second wireless network adapter.

2. The device of claim 1, further comprising a media management subsystem configured to identify a subset of streaming media that is to be delivered wirelessly to latency-sensitive devices.

3. A computing device for low-latency multimedia using dual wireless adapters, comprising:
   a processor;
   a memory;
   a network interface controller;
   a wireless network adapter operating on the computing device and comprising at least a wireless radio configured to operate on a plurality of channels within a specified frequency band; and
   an operating system comprising programming instructions stored in the memory and operating on the processor and configured to:
     establish, using the network interface controller, a streaming multimedia session;
     receive, at a transport layer of the operating system from the streaming multimedia session, streaming multimedia from the Wi-Fi access point, using a first channel of the wireless network adapter, the first channel using a first frequency;
     instruct the transport layer to provide at least a portion of the received multimedia to the second wireless network adapter; and
     send, using the network interface controller, at least the portion of the streaming multimedia to at least one of the plurality of wireless devices using Wi-Fi via a second channel of the wireless network adapter, the second channel using a second frequency.

4. The system of claim 3, further comprising a media management subsystem configured to identify a subset of streaming media that is to be delivered wirelessly to latency-sensitive devices.

5. A method for low-latency multimedia using dual wireless adapters, comprising the steps of:
   establishing, at a network interface controller on a computing device comprising at least a processor and a memory, a streaming multimedia session;
   receiving, at a first wireless network adapter operating on the computing device and from the streaming multimedia session, streaming multimedia content from a Wi-Fi access point via a first Wi-Fi wireless network using a first frequency;
   instructing the transport layer to provide at least a portion of the received multimedia to a second wireless network adapter operating on the computing device and comprising a second antenna and using a second frequency; and
   sending at least a subset of the streaming multimedia to a plurality of devices via a Wi-Fi network, using the second wireless network adapter.

6. The method of claim 5, further comprising the step of identifying, using a media management subsystem stored in the memory and operating on the processor of the computing device, a subset of the received streaming media content that is to be delivered wirelessly to latency-sensitive devices.

* * * * *